Dec. 1, 1953 C. E. KILBOURNE 2,661,434
DYNAMOELECTRIC MACHINE CORE VENTILATION
Filed Aug. 1, 1952 3 Sheets-Sheet 3

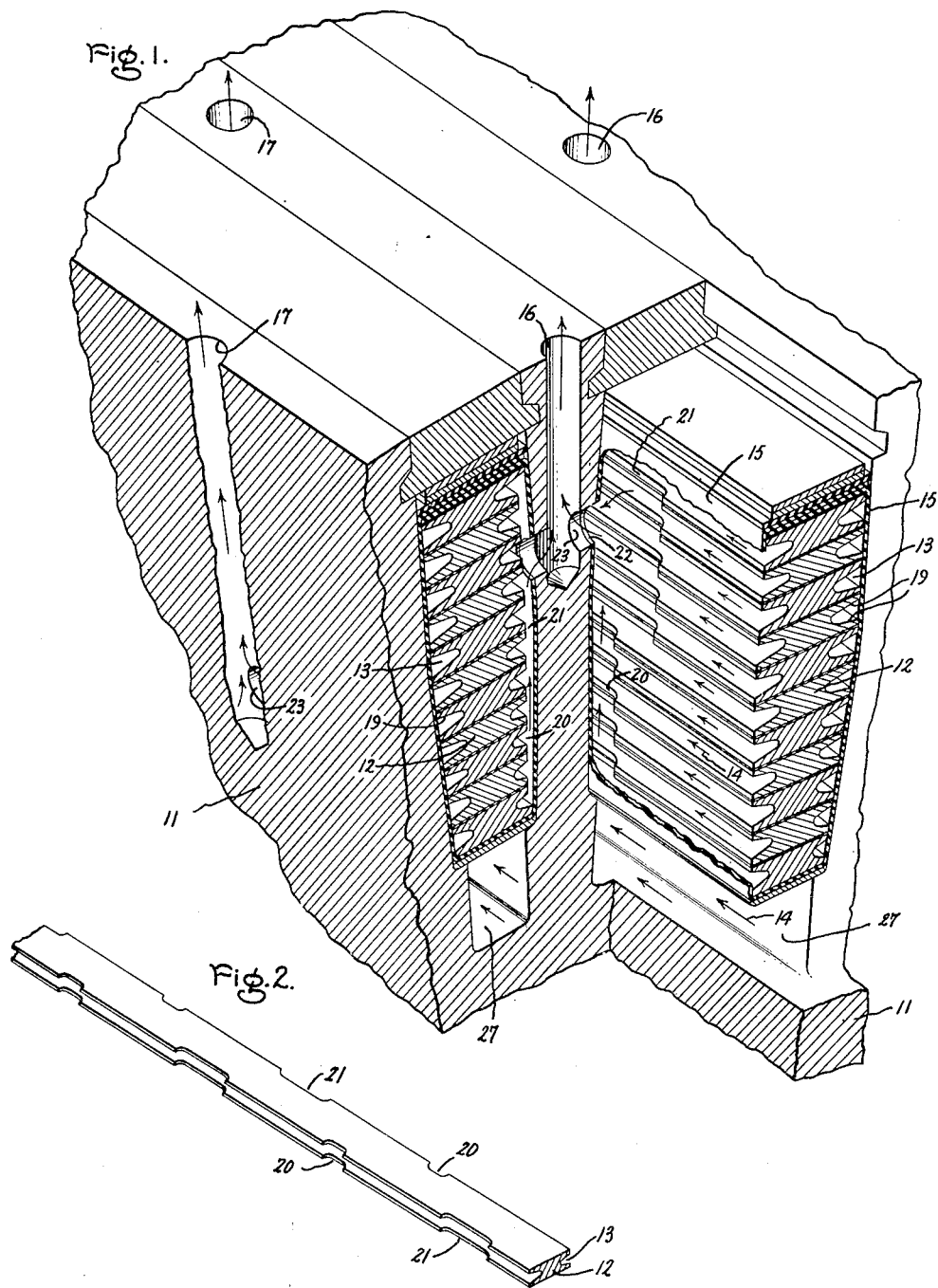

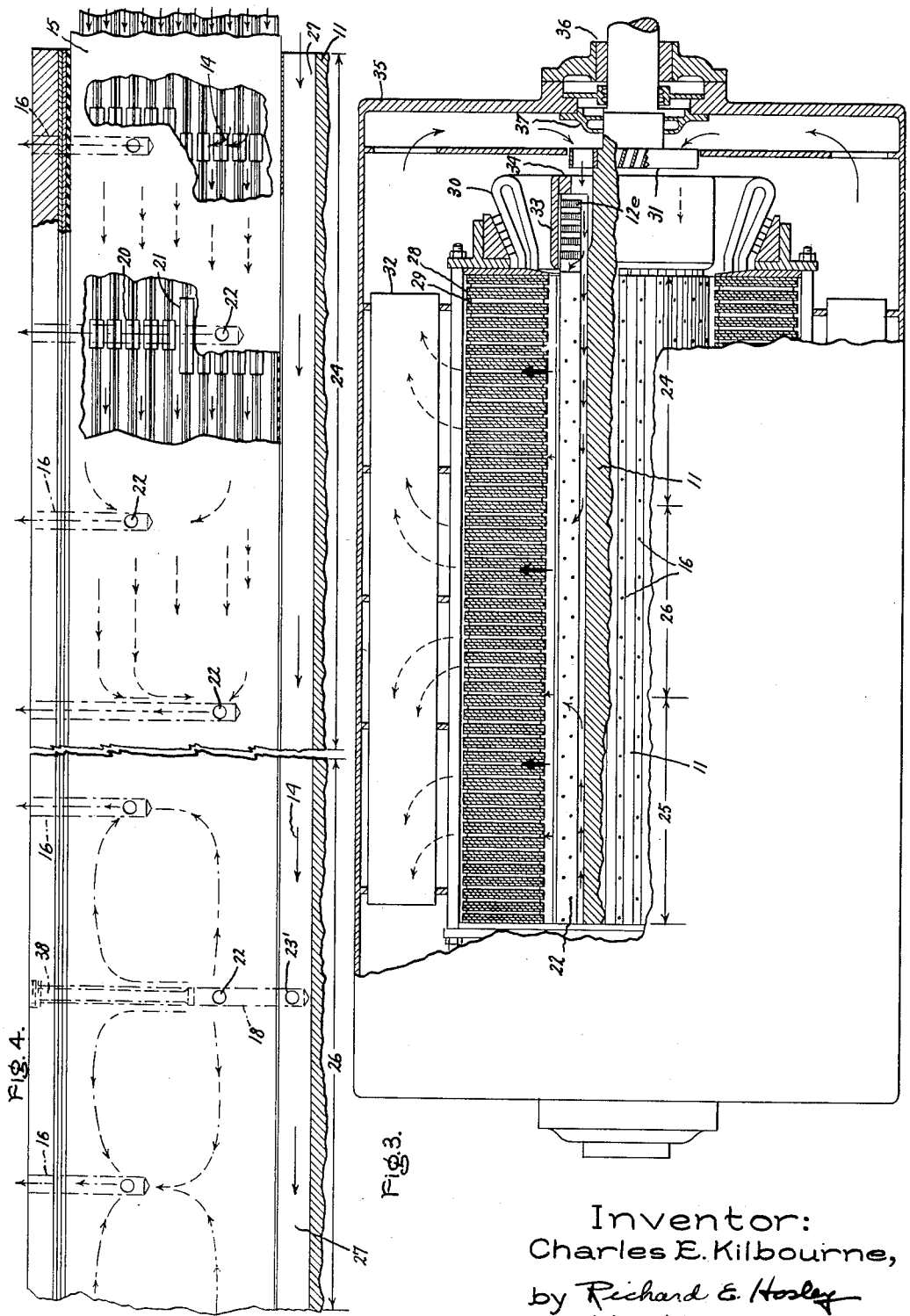

Inventor:
Charles E. Kilbourne,
by Richard E. Hosley
His Attorney.

Patented Dec. 1, 1953

2,661,434

UNITED STATES PATENT OFFICE 2,661,434

DYNAMOELECTRIC MACHINE CORE VENTILATION

Charles E. Kilbourne, Schenectady, N. Y., assignor to General Electric Company, a corporation of New York Application August 1, 1952, Serial No. 302,114

4 Claims. (Cl. 310—64)

My invention relates to improvements in dynamoelectric machines and has particular significance in connection with ventilating arrangements for rotor core members of turbine generators.

Conventionally, generators adapted to be driven by steam turbines to supply large amounts of power have a stationary outer core member having slots containing an armature winding adapted to provide A.-C. output when excitation is provided by a rotor core member having slots containing a field exciting winding energized by direct current. The longer the cores and the windings, the more difficult it is to force the requisite cooling gas toward the axial center, and one of the principal limiting factors affecting the output of such large machines is the temperature rise of the copper conductors making up the stator and rotor windings. In the past, this temperature rise has been affected by the thickness and nature of the insulation surrounding the conductors. Unfortunately, a relatively good electrical insulator is a relatively poor thermal conductor, and if excessive current values force conductor temperature rise too high, temperature deterioration of the dielectric characteristics of the insulation may be so rapid as to cause premature electrical failures. Many times during the past forty years, attempts have been made to place a cooling medium inside the insulating jacket which surrounds the metallic conductor so that a much lower temperature rise of insulation can be realized because the heat will not have to pass through the insulation. Thus, it has been suggested that holes be provided longitudinally through the center of each conductor, but it has been found that this arrangement makes it very difficult to get the cooling gas in and out of the bores so provided in the conductors. Likewise, it has previously been suggested that the sides of the conductors be hollowed out, adjacent the insulation, but all such prior art arrangements with which I am familiar have caused difficulties associated with great length of ventilating medium travel from one end of the core to the other.

It is an object of the present invention to provide simple and inexpensive means for overcoming the above-mentioned difficulties.

A further object of the present invention is to provide improved ventilation and heat dissipation means for use in a dynamoelectric machine core member to increase the rating of a machine of given dimensions or, alternatively, decrease the required dimensions for a machine of the same rating.

A still further object of the present invention is to provide an arrangement for within-the-insulation-ventilation of electrical conductors occupying slots of a dynamoelectric machine core member, which arrangement will permit a more uniform and better distribution of cooling gas through the core and adjacent the conductor material, thus making it possible to construct a machine of smaller size for a comparable rating than is possible when using other ventilation arrangements heretofore proposed.

Briefly stated, in accordance with my invention, the sides of the conductors are cut out to provide axial grooves (leaving axial tongues) inside the insulation; and the tongues, the insulation and the adjacent core are cut away at spaced axial intervals to provide improved gating means for getting cooling gas directly against the current carrying members in the core while simultaneously providing adequate insulation, particularly as to creepage distance, to electrically isolate the winding from the main mechanical parts of the magnetic core member in which it is contained. In addition, means are provided to permit the cooling gas to enter the cooling passages from favorable high pressure gas areas, such as at the ends of the grooves, and to leave the cooling passages through controlled and selected exit areas so that efficient use of the cooling properties of the gas is assured.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

Fig. 1 is a sectional view in perspective of a portion of a turbine generator slotted rotor provided with the conductor elements of a rotor winding and constructed in accordance with the present invention;

Fig. 2 is a perspective view of one of the conductor bars shown in Fig. 1;

Fig. 3 is a side elevational view, partly broken away, of a turbine generator provided with a rotor having a construction such as that illustrated in Fig. 1 along zones at the opposite axial ends thereof and having a different construction in a middle zone;

Fig. 4 is a diagrammatic representation of ventilating gas flow through the center zone of the rotor and through the right-hand end zone thereof;

Figure 5:
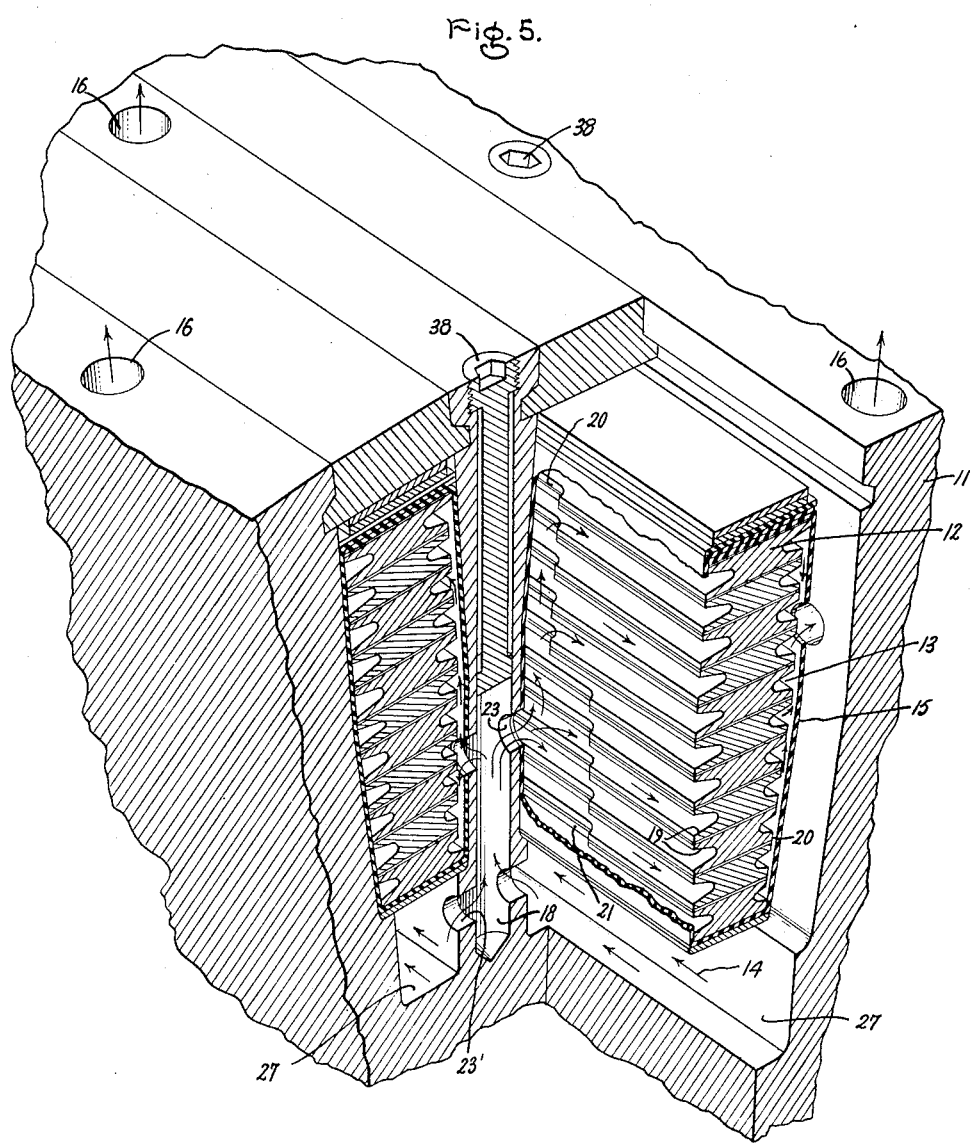
Fig. 5 is a cutaway view in perspective of the construction of a portion of the slotted rotor core and conductors therein in the center axial zone as indicated in Figs. 3 and 4.

Referring now to Fig. 1, I have shown my invention in connection with a portion of a large turbine generator rotor comprising an annular magnetic core 11 which may be a large forging, well over 10 ft. in length and 3 ft. in diameter and provided with axially extending winding slots containing a rotor winding made up of superposed individual conductor bars 12 arranged in the slots and adapted to be energized in a conventional manner (such as through slip rings, not shown).

Conductor bars 12 are so shaped as to have axial grooves or openings 13 in their sides through which cooling gas may flow, as indicated by arrows 14, in contact with the conductor proper and within outer or slot insulation 15. The cooling gas, which may be assumed to be hydrogen, is introduced into the grooves 13 at each end of the rotor, as hereinafter explained in connection with Fig. 3, and travels axially along these conductor openings until it meets one or more exits. The exits comprise a suitable arrangement of shallow and deep radial holes 16, 17 (respectively) drilled in the tooth portions between the winding slots and at axially spaced intervals, for example, every 12 in., with the holes being staggered between teeth as indicated in Fig. 1. The grooves 13 in the conductor bars 12 leave top and bottom tongues 19 which are cut away to provide rectangular exit areas adjacent these radial holes, and, although other suitable arrangements can readily be envisioned, as seen in Fig. 2, each bar tongue is alternately cut away for a small extent 20 and a greater extent 21 in a repetitive pattern along the axial length of the conductor. One suitable arrangement of shallow holes 16 and deep holes 17 is pictured in Figs. 1 and 4 and comprises alternately a hole 16 of lesser length and a hole 17 of greater length, and the conductor bars are stacked so that at each shorter through-the-tooth radial exit 16 there is a lower group of conductors having axial short cutout portions 20 with a superimposed top group of conductors having a longer cutout portion 21. At such a point, the flow of ventilating medium is upward through the shorter cutouts 20 of the lower group of conductors and upward and downward through the longer cutouts 21 of the upper group of conductors and then tangentially through a hole 22 in the insulation and through a hole 23 in the tooth portion and communicating with the radial shallow hole outlet 16. Meanwhile, at alternate axial locations, as most clearly seen in Fig. 4 at the second exit duct from the right-hand end, the arrangement is a lower group of conductors having longer cutouts 21 and an upper group of conductors having shorter cutouts 20, and the direction, radially, of ventilating medium flow adjacent the cutout sections is reversed, that is, downward through the upper section cutouts and upward and downward through the lower section cutouts and then through holes 22 and 23 (Fig. 1) into the bottom of the deep hole radial exit 17 in the tooth portion. I have found that a tangential hole, such as 23, can readily be cut by means of an L-shaped tool comparable to a dentist drill, and which can be inserted either in the radial hole (16, 17) or in the winding slot itself before the winding is placed therein; but I do not mean to limit the present invention to the L-shaped passages thus provided since, obviously, diagonal drilled passages from tooth periphery to winding slot could be used instead.

Referring now to Fig. 3, which is a cutaway elevational view of a generator embodying the invention, I have shown the rotor core 11 of Fig. 1. In Fig. 3, the rotor conductor bars 12 and their grooves 13 are hidden by the insulation 15 although the rotor gas passages are indicated to some extent by the location of the holes 22 in the insulation. Since the rotor and stator cores of modern large high-speed turbine generators are usually more than 10 ft. in length, thus creating quite a problem in connection with ventilation of the core portions adjacent the axial center of the machine, I provide a different cooling arrangement for a center part, or zone, of the rotor core. In Fig. 3, there is indicated a right-end zone 24, a left-end zone 25, and a center zone 26, and unlike the arrangement in end zone 24 (which is fed as described in connection with Fig. 1), and unlike end zone 25 (fed the same as 24 except opposite hand), the center zone 26 is fed partly or, as shown, entirely from a sub-slot 27 which extends beneath the winding in each winding slot for the entire length of the rotor, as indicated in Figs. 1, 3, 4 and 5. Ventilating gas is introduced into the ends of this sub-slot and travels toward the center of the rotor core as indicated by some of the arrows 14 in Fig. 3. The rotor provides a rotating field cooperating electrodynamically with a stator core portion, which in the illustrated embodiment comprises stacks 28 of laminations interspaced by radially extending ventilating passages 29. The stator core portion is provided with winding slots containing the individual elements of a stator winding 30 around and between which the ventilating medium flows while passing through the radial ducts 29 as indicated by a portion of the arrows 14. The machine is provided with axial flow fans 31 rotatable with the shaft of the machine and adapted to circulate ventilating medium through the sub-slots 27, the conductor side grooves 13, and eventually (as hereafter described) out to the rotor periphery across the so-called "air gap," then up through the radial ducts 29 and out of the stator core and into one or more coolers 32, with the ventilating medium in the vicinity of the coolers traveling both tangentially and axially until it finally returns to the intake of one or the other of fans 31 provided at each end of the machine. Rotor end turns 12e are held in place at each end by a more or less conventional retaining ring 33 pressed over the assembly and onto a centering ring 34 through which axial holes are provided to allow introduction of the cooling medium (from the fan 31 discharge) into the sub-slots 27 and conductor grooves 13. The machine is provided with an outer housing 35, bearings 36, and shaft seals 37, and, as already explained, the cooling arrangement differs in axial zones 24—26 according to whether the cooling medium originates primarily from the sub-slots as it does in center zone 26 or whether it originates from the conductor grooves 13 provided in the sides of the conductors as it does in end zones 24 and 25.

Referring now to Fig. 4, I have shown a diagrammatic illustration of a portion of the rotor core in right-hand end zone 24 (at the right in Fig. 4) and of a portion of the rotor core in center zone 26 (at the left in Fig. 4). The arrangement in end zone 24 may also be understood from consideration of Fig. 1, and the arrangement in center zone 26 may be understood from consideration of Fig. 5, which is a perspective and sectional view of a rotor portion in the center zone and showing, as indicated by arrows 14, the ventilating medium travel through the sub-slot 27 entering through tangential holes 23′ into the bottoms of extra deep radial passages 18 provided in the tooth portions intermediate the winding slots. These passages 18 are even deeper than the longest passages 17 characteristic of the end zones (and shown in Fig. 1) and are, moreover, sealed at their top ends by the threaded engagement of sealing plugs 28 which cause these longer radial slots 18 to act not as exit ducts but as entrance ducts from which the cooling gas leaves by way of additional tangential holes 23 through the tooth and communicating through a hole 22 provided in the winding slot insulation with wide conductor tongue cutouts 21 characteristic of a lower group of conductors and communicating with narrower cutouts 20 characteristic of an upper group of conductors and then the ventilating medium, as indicated by arrows 14, travels through the ducts 13 formed in the side of the conductor bars away from the center of the machine on one side of the entrance duct 18 and toward the center of the machine on the opposite side of the entrance duct until it finds its way to alternate shorter radial exit ducts 16 from which it discharges, in a manner similar to that described in connection with Fig. 1, into the air gap and then through the stator radial cooling ducts 29 and around and through the coolers 32 and back to the entrance of the fans at each end of the machine, as indicated in Fig. 3.

While I have illustrated and described the present invention relating to means for getting cooling fluid directly against current carrying members of a dynamoelectric machine core, only in connection with cooling circuits from the rotor core winding conductors, obviously the same or similar means could be extended to take care of direct cooling of stator winding conductors as well. It will be noted that with the arrangement disclosed, means are provided for permitting cooling gas to enter cooling passages from favorable high pressure gas areas and to leave through controlled and selected exit areas to afford efficient use of the cooling properties of the cooling gas. The shape of the ventilating grooves in the sides of the conductors can be of any suitable configuration, and these grooves connect directly with the end structure of the machine beneath the retaining rings to permit the gas to flow into these conductor openings. While the conductors are shown recessed in rectangular areas for gas passage between grooves, the areas could be circular or of another shape and serve just as well to distribute the ventilating medium adjacent the exits (or entrances) comprising the radial holes drilled in the tooth and tapped through the slot wall and insulation. The recessed areas serve an important function in allowing more than adequate creepage distance of insulation between the metal of the core 11 and the metal of the conductors 12 adjacent the openings 22 in the insulation. It is to be particularly noted that with the arrangement of the invention, there is no substantial narrowing of the flux carrying area of the tooth intermediate the winding slot because the usual axial ventilating passages in such teeth have now been eliminated and because the radial ducts through the teeth will have no appreciable effect on flux carrying ability since these radial holes are axially spaced by an amount relatively great compared to their own width. Because the arrangement of the invention allows smaller machines for the same rating, it has the important advantage of resulting in a substantial saving in copper and in steel, and there is thus provided a device of the character described capable of meeting the objects hereinabove set forth.

While I have illustrated and described a particular embodiment of invention, various modifications will obviously occur to those skilled in the art. I desire it to be understood, therefore, that my invention is not to be limited to the particular arrangement disclosed, and I intend in the appended claims to cover all modifications which do not depart from the true spirit and scope of my invention.

What I claim as new and desire to secure by Letters Patent of the United States is:

1. A ventilating arrangement for a dynamoelectric machine annular magnetic core provided with axially extending winding slots defining teeth therebetween and having a winding comprising superposed conductor bars arranged in said slots with slot insulation between the walls of each slot and the superposed conductor bars therein, said conductor bars having axially extending grooves defining tongues on their sides adjacent said insulation, fan means for introducing ventilating gas to the ends of said grooves, said conductor bar tongues being cut away at spaced axial intervals to provide exit areas, and said teeth having a plurality of outlet passage each opening at one end at the periphery of said rotor and each communicating at the other end through said insulation with at least one of said exit areas for allowing said ventilating gas to leave said grooves intermediate the ends of said core.

2. A ventilating arrangement for a dynamoelectric magnetic core as in claim 2 further characterized by the tongues of each bar being repetitively cut away for lesser and greater extents, and the tooth outlet passages comprising radial holes repetitively of shallow and longer depth and comprising tangential holes through core and insulation adjacent the bottoms of said radial holes, with the bars and holes constructed and arranged so that there is a plurality of said deep radial holes communicating through corresponding tangential holes with bar grooves adjacent longer exit areas provided by longer tongue cutouts and thereabove with bar grooves adjacent shorter exit areas provided by shorter tongue cutouts, and a plurality of said shallow radial holes communicating through corresponding tangential holes with bar grooves adjacent longer exit areas provided by longer tongue cutouts and therebelow with bar grooves adjacent shorter exit areas provided by shorter tongue cutouts.

3. A ventilating arrangement for a dynamoelectric machine annular rotor core member provided with axially extending winding slots and having a winding comprising superposed conductor bars arranged in said slots with slot insulation between the walls of each slot and the bars therein, said bars having their sides provided with axially extending grooves defining ventilating passages intermediate tongues adjacent said insulation, said core member being provided with additional ventilating passages in the form of subslots located beneath the conductor bar occupied winding slots, said tongues being cut away at axially spaced intervals to provide areas for gas passage radially between the grooves of superposed conductor bars, fan means for introducing ventilating medium to the axial ends of said axial grooves and to the axial ends of said subslots, a plurality of radial and tangential passages through said core at axially spaced intervals between said winding slots with some of said plurality of passages communicating between the sub-slots and the areas for gas passage between grooves in an axially center zone of said rotor core, and other of said plurality of passages communicating between the rotor outer periphery and areas for gas passage between grooves in end zones of said rotor core such that the ventilating medium will travel through said grooves and through said sub-slots and in the end zones from said grooves through some of said areas and through some of said tangential and axial passages to the periphery of said rotor and in the center zone through other of said tangential and axial passages to other of said areas and into the adjacent grooves, thereby permitting said ventilating medium to enter said grooves adjacent the conductor bar material from high pressure areas and to leave said grooves through controlled and selected exit areas to insure efficient use of the cooling properties of the ventilating medium.

4. In a dynamoelectric machine having a stator core and a cooperating rotor core within said stator, said cores being provided with slots and windings comprising insulated conductor bars carried in the slots, ventilating means comprising in at least one of said members the provision of cutaway sides in each conductor bar forming longitudinally extending grooves defining tongues engaging the insulation surrounding the conductor, means for introducing a coolant fluid to the ends of said grooves, the tongues of said conductor bars being cut away at axially spaced locations to provide radially extending exit passages, said one core member between the slots defining a plurality of axially spaced drilled holes opening at one end at the periphery of the rotor and each communicating at the other end through said insulation with at least one of said exit passages for allowing the coolant to leave said grooves intermediate the ends of said core.

CHARLES E. KILBOURNE.

References Cited in the file of this patent

FOREIGN PATENTS

| Number | Country | Date |
|---|---|---|
| 714,319 | France | Sept. 1, 1931 |